July 6, 1943.  F. O. COLPRON  2,323,379
RECEPTACLE
Filed Feb. 7, 1941  2 Sheets-Sheet 2
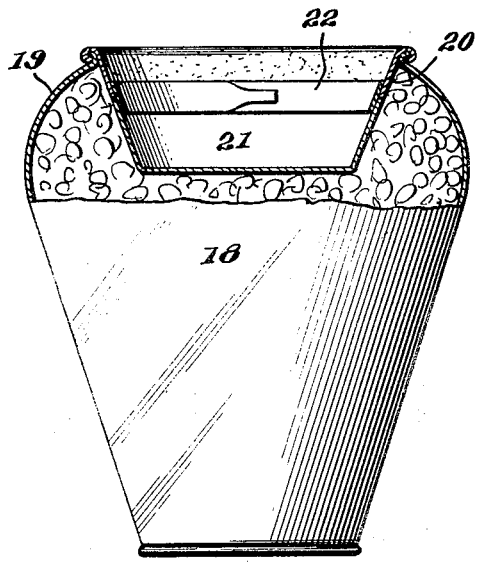
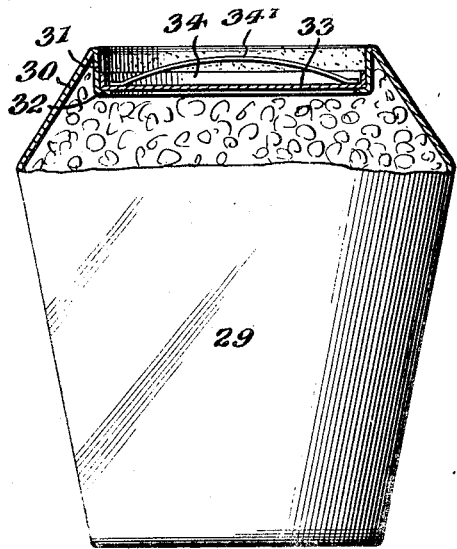
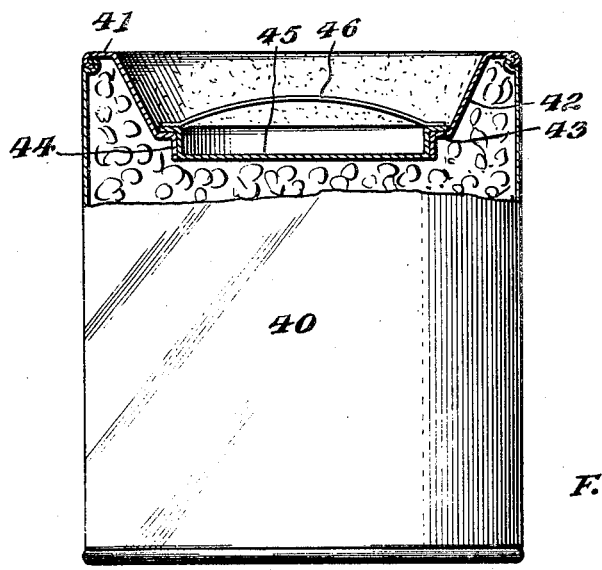
Inventor
F. O. Colpron, Patented July 6, 1943

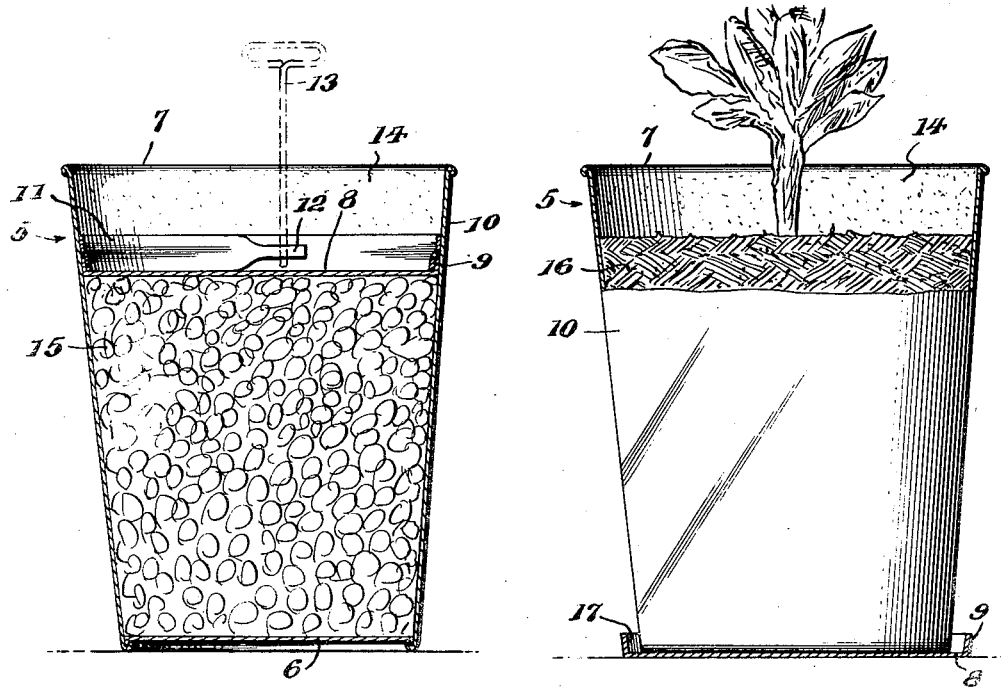
Fig. 1. Fig. 2.
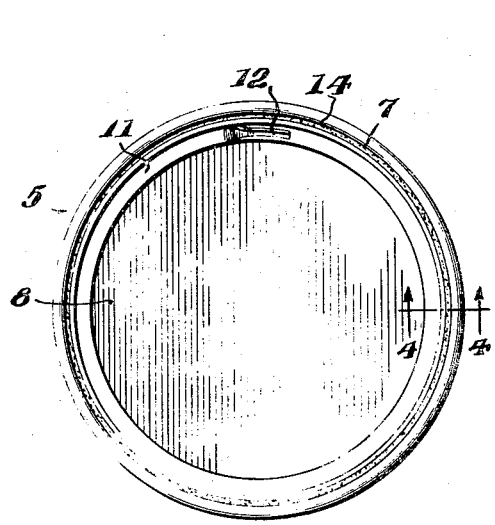 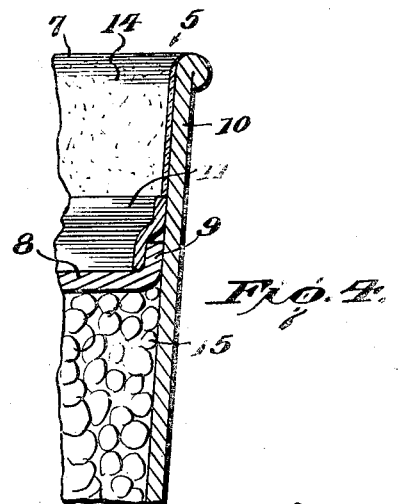
Fig. 3. Fig. 4.

2,323,379

UNITED STATES PATENT OFFICE 2,323,379

RECEPTACLE

Freda O. Colpron, Warren, Minn.

Application February 7, 1941, Serial No. 377,927

1 Claim. (Cl. 220—61)

My invention relates to receptacles and has as one of the principal objects thereof the provision of a receptacle so constructed and arranged as to serve as a vending container for merchandise and which is capable of being used as a flower pot after the contents originally packed therein have been removed.

Another object of my invention is to provide a device of the above described character which when utilized as a flower pot presents an attractive and ornamental appearance thereby enhancing its value as a flower pot.

A further object of my invention is to provide a device of the above described character so constructed and arranged wherein a portion of the interior of the receptacle, adjacent the cover or lid, is finished in a manner to lend attractiveness to the receptacle and thus promote its use as a flower pot.

An important object of my invention is to provide a device of the character described which is simple in construction, durable in use, efficient in operation and economical in manufacture.

Other objects and advantages will be apparent from the following description, appended claim and annexed drawings.

Referring to the drawings wherein like reference characters designate like parts throughout the several views:

Figure 1 is a vertical sectional view of my invention and illustrating the receptacle in use as a merchandise container.

Figure 2 is a vertical sectional view of the receptacle and illustrating the same utilized as a flower pot.

Figure 3 is a top plan view of Figure 1.

Figure 4 is a detail sectional view taken on the line 4—4 of Figure 3.

Figure 5 is a side elevation, partly in section, of a modified form.

Figure 6 is a side elevation, partly in section, of another modified form.

Figure 7 is a side elevation, partly in section, of a further modified form.

In practising my invention, as illustrated in Figures 1 to 4 inclusive of the drawings, I provide a substantially inverted frustum-shaped container 5 provided with a bottom 6 and an open mouth or top 7. Disposed within the container, subjacent the top 7, is a lid 8, the latter being fashioned with an upwardly disposed and circumferentially extending flange 9 disposed in appressed relation with the inner peripheral face of the side wall 10 of said container. Circumjacently arranged about said lid is a rupturable ring 11, the latter being preferably constructed of relatively soft material and formed with a tongue 12 for receiving thereon the end of a key 13.

One side of the ring 11 is disposed in appressed relation with the inner circumferential face of the flange 9 while the other side of said ring is disposed in appressed relation with the adjacent face of the wall 10 of the container and said sides of said ring are soldered or otherwise secured to the wall 10 and flange 9 to form a seal between the lid and wall 10. By rotating the key 13 and winding the tongue 12 thereon the ring will be severed or ruptured in a manner whereby the lid may be readily removed from the container. Inasmuch as the foregoing described means for sealing the lid to the can is of a well known and ordinary construction, which forms no part of the present invention per se, a more detailed description of said means and its operation is not believed warranted.

The inner face of the wall 10, between the top of the receptacle and the ring 11, is coated with a suitable enamel or paint 14 to lend an attractive and ornamental appearance to the receptacle and also to define a soil level within the receptacle when the latter is utilized as a flower pot, it being understood that the outer face of the wall 10 is provided with suitable ornamentation to lend an attractive appearance to the device.

As illustrated in Figure 1, when food products 15 or the like are disposed within the receptacle, the top or cover 8 is sealed thereover to preserve the contents. Upon removal of the lid 8, in the manner heretofore described, and the contents 15 dispensed, the receptacle is filled with soil 16 and with the level of the soil being defined by the enamel. When the receptacle is thus utilized as a flower pot, as illustrated in Figure 2, the cover or lid 8 is inserted under the bottom 6 and serves as a suitable reservoir or saucer 17, it being understood that the bottom portion of the receptacle may be punctured to provide openings for feeding the soil 15 with water from the reservoir 16.

In the modified form illustrated in Figure 5 of the drawings, the container 18 is fashioned with a bulbous-shaped top 19 provided with an inwardly disposed frustum-shaped section 20, the lower end of the section having secured thereto a cover or lid 21 by means of a rupturable ring 22 operable in the same manner as the ring disclosed in the preferred embodiment to effect removal of the lid 21 from the container. Superjacent the ring 22, the inner face of the section 20 is coated with enamel or paint to lend an attractive appearance to the container and to define a soil level as in the instance of the preferred embodiment.

In the modified form illustrated in Figure 6, the container 29 is fashioned with a frustum-shaped top 30 provided with an inwardly disposed circular section 31 terminating in an inwardly and circumferentially extending flange constituting a seat 32 defining an opening through which the contents of the container are dispensed or received. The opening is closed by a lid 33 fashioned with a flanged rim 34 frictionally engaging the section 31 adjacent the flange and with the lid supported on the seat. The section 31, above the seat 32, is provided with paint or enamel to lend the container an attractive appearance and to define the soil level. The lid 33 is provided with a bail or handle 34' to facilitate removal of said lid from within the section 31.

As illustrated in Figure 7, the container 40 is of a cylindriform configuration and provided with a top wall 41 fashioned with an inwardly directed substantially frustum-shaped section 42. The lower end of the section 42 terminates in an inwardly extending flange 43 with a depending lip 44 defining a seat for frictionally securing thereto a cover 45 for closing said container. As in the instance of the form of the invention illustrated in Figure 6, the cover 45 is also provided with a handle 46 to facilitate its removal from the container. Superjacent the seat, the exposed face of the section 42 is provided with paint or enamel to lend an attractive appearance to the receptacle and to define a soil level.

It is a common practice to utilize cans or receptacles, from which the original contents have been removed, as flower pots. However, this is objectionable due to the fact that when lids or covers are removed they expose an unfinished or undecorated portion of the inner face of the can to view and which portion, in many instances, becomes rusted or otherwise unsightly thereby detracting from the appearance of the can, especially above the soil level, when utilized as a flower pot. From the foregoing, it will be apparent that my invention overcomes this undesirable feature by reason of disposing the cover or lid a substantial distance below the top of the can and ornamenting the exposed inner face of the can above the lid, for instance by means of paint or enamel and which defines the soil level and prevents rusting of that portion of the inner face above said soil level. Furthermore, the paint or enamel, when applied after the cover or lid is secured within the receptacle, contributes to the sealing of the same within the receptacle.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claim.

What I claim is:

In a receptacle, a container having an open end and provided with a decorative covering on the interior thereof and extending a selected distance inwardly of the container from said open end and defining a marking by the inner edge thereof to indicate the height earth should be extended in the container for the planting of a plant in said container and acting to protect the exposed portion of the interior of the container from deteriorating and to render said portion attractive, a closure including a peripheral flange engaging the interior of the container inwardly of the covering, and a destructible ring secured to the flange of the closure and to the interior of the container with an edge of the ring abutting the inner edge of the covering.

FREDA O. COLPRON.